(12) United States Patent
Kim

(10) Patent No.: US 7,698,063 B2
(45) Date of Patent: Apr. 13, 2010

(54) NAVIGATION SYSTEM AND THE OPERATING METHOD THEREOF

(75) Inventor: Hee Jeong Kim, Seoul (KR)

(73) Assignee: LG Electronics, Inc., Seoul (KR)

( * ) Notice: Subject to any disclaimer, the term of this patent is extended or adjusted under 35 U.S.C. 154(b) by 198 days.

(21) Appl. No.: 11/782,776

(22) Filed: Jul. 25, 2007

(65) Prior Publication Data
US 2008/0021641 A1 Jan. 24, 2008

Related U.S. Application Data

(63) Continuation of application No. 10/777,700, filed on Feb. 11, 2004, now Pat. No. 7,440,850.

(30) Foreign Application Priority Data
Feb. 10, 2003 (KR) .............................. 10-2003-8102

(51) Int. Cl.
*G01C 21/34* (2006.01)
*G01C 21/36* (2006.01)

(52) U.S. Cl. ................. 701/211; 701/209; 701/201; 340/990; 340/995.2; 340/995.17; 340/995.19; 340/995.25

(58) Field of Classification Search ......... 701/208–209, 701/211, 213, 201; 340/990, 992.5, 209, 340/995.17, 995.19; 345/418
See application file for complete search history.

(56) References Cited

U.S. PATENT DOCUMENTS 4,782,447 A * 11/1988 Ueno et al. ................ 701/208
4,878,170 A * 10/1989 Zeevi ........................ 701/211
5,323,321 A * 6/1994 Smith, Jr. ................... 701/211
5,638,279 A * 6/1997 Kishi et al. ................. 701/200

(Continued)

FOREIGN PATENT DOCUMENTS

CN 101520332 A * 9/2009

(Continued)

OTHER PUBLICATIONS

Wanke, C. R. et al., An experimental evaluation of a GNS—added course guidance technique for general aviation, Digital Avionics Systems Conf., 1995; 14th DASC Nov. 5-9, 1995, p. 197.*

(Continued)

*Primary Examiner*—Cuong H Nguyen
(74) *Attorney, Agent, or Firm*—Lee, Hong, Degerman, Kang & Waimey

(57) ABSTRACT

The present invention relates to a navigation system in which that navigation system shows a configuration of a complicated intersection a driver is about to enter, and displays where to turn and a progression rate of the car on the path the driver is headed to. The navigation system comprises a Gyro sensor for detecting a rotation angle of the car; and route information from the Gyro sensor to generate the configuration of an intersection the user is supposed to enter and an arrow indicating a driving route to the user, and to display a progression rate of the car along the route; a display driving unit for displaying the configuration of the intersection and the arrow for route guidance, and a gradual progression rate of the car is indicated in the directional arrow.

14 Claims, 9 Drawing Sheets

U.S. PATENT DOCUMENTS

| | | | | |
|---|---|---|---|---|
| 5,862,509 | A * | 1/1999 | Desai et al. | 701/209 |
| 5,926,118 | A * | 7/1999 | Hayashida et al. | 340/995.21 |
| 6,119,066 | A * | 9/2000 | Sugiura et al. | 701/208 |
| 6,360,168 | B1 * | 3/2002 | Shimabara | 701/211 |
| 6,405,131 | B1 * | 6/2002 | Barton | 701/211 |
| 6,516,273 | B1 * | 2/2003 | Pierowicz et al. | 701/301 |
| 6,606,558 | B2 * | 8/2003 | Hamada et al. | 701/211 |
| 6,816,782 | B1 * | 11/2004 | Walters et al. | 701/209 |
| 6,871,144 | B1 * | 3/2005 | Lee | 701/213 |
| 6,975,940 | B1 * | 12/2005 | Childs et al. | 701/209 |
| 7,099,771 | B1 * | 8/2006 | Walters et al. | 701/200 |
| 2002/0133291 | A1 * | 9/2002 | Hamada et al. | 701/208 |
| 2002/0169554 | A1 | 11/2002 | Suda | |
| 2004/0162672 | A1 * | 8/2004 | Kim | 701/209 |
| 2004/0193366 | A1 * | 9/2004 | Tompkins et al. | 701/201 |
| 2005/0065718 | A1 * | 3/2005 | Kao et al. | 701/201 |
| 2007/0124069 | A1 * | 5/2007 | Nakayama et al. | 701/210 |
| 2007/0216684 | A1 * | 9/2007 | Hsu | 345/441 |
| 2008/0021641 | A1 * | 1/2008 | Kim | 701/209 |
| 2009/0222202 | A1 * | 9/2009 | Kato | 701/210 |

FOREIGN PATENT DOCUMENTS

| | | | |
|---|---|---|---|
| DE | 4412859 | | 11/1994 |
| DE | 10039687 | | 2/2002 |
| DE | 69626893 E | * | 4/2003 |
| DE | 202004017418 U1 | * | 2/2005 |
| EP | 0542331 | | 5/1993 |
| EP | 751376 A2 | * | 1/1997 |
| EP | 0767448 | | 4/1997 |
| EP | 1063493 | | 12/2000 |
| EP | 1793206 A2 | * | 6/2007 |
| EP | 2096411 A2 | * | 9/2009 |
| JP | 08016991 A | * | 1/1996 |
| JP | 11-083518 | | 3/1999 |
| JP | 11083518 A | * | 3/1999 |
| JP | 11328592 A | * | 11/1999 |
| JP | 2000055681 A | * | 2/2000 |
| JP | 2002310711 A | * | 10/2002 |
| JP | 2008115690 A | * | 5/2008 |
| RU | 2160930 | | 12/2000 |

OTHER PUBLICATIONS

Trahabias, P. E. et al., Navigational support for robotic wheelcharir platforms; an approach that combines vision and range sensors; Robotic & Automations, 1997, Ieee Inter. jour. conference on, vol. 2, Apr. 20-25, 1997, pp. 1265-1270. Digital Identifier 10.1109/R.*

Unknown author, GPS car nagivation system, hardcopy printed on Nov. 13, 2006, from http://www.electronics-manufacturers.com/info/satellite-communications/gp- s-car-navigation. cited by other.*

Jeffrey A. Millington, 3-dimensional intersection display for vehicle navigation system, published on Aug. 26, 2003, from http://www.freepatentsonline.com/. cited by other.*

* cited by examiner

Actual intersection

Guidance through image

Guidance through arrow only

NAVIGATION SYSTEM AND THE OPERATING METHOD THEREOF

CROSS REFERENCE TO RELATED APPLICATION

This application is a continuation of U.S. application Ser. No. 10/777,700, filed Feb. 11, 2004 (issued as U.S. Pat. No. 7,440,850 on Oct. 21, 2008), which, pursuant to 35 U.S.C. §119(a), claims the benefit of earlier filing date and right of priority to Korean Application No. 10-2003-8102, filed on Feb. 10, 2003, the contents of which are hereby incorporated by reference herein in their entirety.

BACKGROUND OF THE INVENTION

1. Field of the Invention

The present invention relates in general to a navigation system, more particularly, to a navigation system and an operating method thereof, in which the navigation system shows the configuration of a complicated intersection a driver is about to enter, and displays where to turn and a progression rate of the car on the path the driver is headed to.

2. Discussion of the Background Art

In general, a navigation system marks on a map displayed on a screen a present position of a moving object that is calculated on the basis of information received from a Global Positioning System satellite (hereinafter, it is referred to as 'GPS').

Also, the navigation system provides a driver with any kind of information the driver needs for travelling, such as, travelling direction of the moving object, distance to a destination, present driving speed of the moving object a path to the destination set by the driver before he takes off, and an optimal path to the destination.

A navigation system or GPS is widely used in various kinds of moving objects including ships, aircraft, or cars, and confirms a present position and a travelling speed of the moving object or determines a travelling path.

Particularly, a navigation system calculates the present position of the moving object on the basis of radio waves (or signals) indicating latitude, longitude, and altitude of the moving object provided from a plurality of GPS satellites. After that, a navigation system provides map information including the present position of the moving object to the driver with visual or voice guidance.

Therefore, a full navigation system is a route guidance system that calculates a present position of a car on the basis of information received from GPS and marks the present position of the car on a map or a screen.

A full navigation system also provides a driver with any kind of information the driver needs for travelling, such as, travelling direction of the moving object, distance to a destination, present driving speed of the moving object, a path to the destination set by the driver before he takes off, and an optimal path to the destination.

FIG. 1 is a diagram illustrating a configuration of a related art navigation system.

Referring to FIG. 1, a GPS receiver 102 receives position data transmitted from a plurality of GPS satellites 100 over an antenna, and a velocity sensor/Gyro sensor 104 detects rotation angle and velocity of the car.

An input unit 106 is a user interface where a user inputs any kind of key signal or sets a travelling path he wants to take.

A map data memory 108 stores map data and other additional information data. A CD-ROM (Compact Disk-Read Only Memory) is generally used as the map data memory 108.

A controller 110 controls general operations of the navigation system. To this end, the controller 110 determines a present position of a moving object on the basis of signals received from the GPS receiver 102, and matches the determined present position of the moving object on the map data stored in the map data memory 108.

When the user inputs a starting point and a destination through the input unit 106, the controller 110 searches a travelling path from the present position of the moving object to the destination, referring to the map data stored in the map data memory 108. Then the controller 110, through a display driving unit 112, makes a display 114 show the searched travelling path on a digital map.

A voice guidance unit 116 generates a voice through a speaker 118, guiding the driver of the moving object to the travelling path. However, this voice guidance is not absolutely required for the above described navigation system.

In short, the navigation system receives GPS satellite signals from a plurality of GPS satellites 100 located around the earth, and tracks down the trace of a car by detecting a travelling direction of the car.

Further, the navigation system provides the driver of the car with a shortest path from the starting point to the destination.

However, drivers who are not good at map reading or who cannot read the digital map fast enough often feel inconvenient to use the related art full navigation system because it only marks the present position of the car on the digital map displayed on the screenand does not provide any other tools to recognize the marked position.

Also, the complicated operational method thereof adds another inconvenience to drivers because it sometimes disturbs the drivers' concentration on driving, and it can end with car accidents.

To resolve the above problems, a Turn-By-Turn (hereinafter referred to as 'TBT') navigation system is now on the market. The TBT navigation system, unlike the full navigation system, uses an arrow to indicate in which direction the driver need to go.

Needless to say, the most fundamental yet essential function in a GUID (Graphic User Interface) of the TBT navigation system is a direction arrow.

FIG. 2 illustrates one embodiment of a traffic information service system, in which a portable terminal displays guidance for an intersection, i.e. in which direction a car should turn, by using an arrow.

To get the service shown in FIG. 2, a user should access to a wireless Internet by operating his portable terminal and choose 'Traffic information service'. After that, he should input a destination he wants to go to. Then, the traffic information service system displays useful traffic information on an LCD of the portable terminal leading to the destination by using a direction arrow.

Referring to FIG. 2, on the top end of the LCD 200 of the portable terminal is the name of an intersection (e.g., First insurance intersection 210), and at the central portion of the LCD 200 is a left turn directional arrow 220 for the intersection. Also, three displays are on the right side of the directional arrow 220: a distance display 230 that tells how long a distance is left to the junction of the intersection, another distance display 240 that tells how long a distance is left to the user's desired destination, and a time display 250 that tells an amount of time left to get to the destination. At the bottom portion of the LCD 200 is a road name display 260, and a GPS receiving availability display 270 which indicates whether or not GPS signals can be received.

However, a problem with using an arrow for guiding in intersections to the destination is that a driver can be easily confused at which road he has to turn when being in an intersection because the directional arrow image does not always coincide with a real road.

Moreover, in case of a complicated intersection that is usually composed of several nodes and links and which cannot be indicated by one single node, it is hard to show the complicated intersection simply by using a left/right turn directional arrow.

What happens when the left/right turn directional arrow is applied to every node of a complicated intersection is that the driver (or the user) can be confused at the ever fast changing arrow.

Even though the directional arrow could be used only once at a complicated intersection, a driver needing to enter a complicated intersection larger and more complex than general intersections will still be more confused, not knowing where to turn.

In the past years, navigation systems have been used to perform route guidance by using arrow images, e.g., straight, left turn, right turn, and U-turn. This method has not been effective for real situations because in many intersections the roads are connected to each other in diverse angles.

Especially, when roads connected to an intersection are very near, the directional arrow image is rather confusing to the driver, only leaving the driver without finding into which road he should turn.

FIG. 3A through FIG. 3C illustrate usage of a directional arrow to a destination path when the intersection configuration is complicated, according to a related art TBT navigation system.

FIG. 3A illustrates a simple configuration of the real intersection seen from an entrance road of a car, in which intersection the entrance road is connected to several other roads.

As shown in FIG. 3A, the other roads are connected to the intersection in diverse angles. Particularly, an exit road is very densely located to the next roads.

Therefore, what most possibly happens when the related art TBT navigation system performs route guidance simply by using arrow images, i.e. straight, left turn, right turn, and U-turn, as shown in FIG. 3B, is that the driver misses the path he should take and goes to an adjacent road instead because there is a big difference between the arrow image direction and the direction of the actual exit road he should go.

For instance, referring back to FIG. 3A, a total of four roads are connected to the entrance road in different directions.

Here, the heading-up road is located on 210 degrees counterclockwise from the entrance road.

In such a case, a traditional navigation system provides the driver with a left turn arrow image similar to the one shown in FIG. 3B. However, comparing FIG. 3B with FIG. 3A, it is evident that the left turn arrow image is much different from the actual configuration of the roads, and thus, the driver can be confused in the intersection, not knowing where to turn.

Although the related art TBT navigation system stores a variety of different shapes of arrow images for guidance, there still is a Limitation on its guidance in the intersections due to the technical features of the information terminal for the vehicle. Hence, the TBT navigation system could not provide an accurate arrow image for every intersection in real life.

Moreover, storing more than one arrow image for guidance and displaying the arrow images to the driver consumes too much memory of the TBT navigation system, even though it is done as an aid of the driver.

On the other hand, as shown in FIG. 3C, an arrow image can be flexible enough to set a free angle. However, if the roads connected to the entrance road are densely built up and the driver gets only the arrow for guidance, it is not easy to distinguish the exit road from the other roads of the intersection.

Another problem in the related art TBT navigation system is that it does not indicate a progression rate of the car entering to the complicated intersection. Thus, there is no way the driver can find out if he is actually entering the exit road as he intended.

SUMMARY OF THE INVENTION

An object of the invention is to solve at least the above problems and/or disadvantages and to provide at least the advantages described hereinafter.

Accordingly, one object of the present invention is to solve the foregoing problems by providing a navigation system and an operating method thereof, the navigation system quickly generating an arrow, which reflects the configuration of a complicated intersection in order to guide a driver where to turn, displaying the arrow to the driver, providing a present position of the car to the driver and displaying a present progression rate of the car, whereby the driver can easily single out the exit road he wants to go no matter how many roads ate connected to the driver's entrance road in the intersection, even when the intersection is made of a plurality of nodes and links and cannot be indicated by one single node.

The foregoing and other objects and advantages are realized by providing a navigation system including a map data memory for storing map data, an input unit including a route guide module, in which a user inputs information and/or designates a travelling path, whereby the route guide module provides information on a route from an entrance road of a car to an exit road from an intersection, a GPS receiver including a positioning module for detecting a present position of the car on the basis of position information provided from at least one GPS satellite, a Gyro sensor for detecting a rotation angle of the cat, a controller, which uses the map data from the map data memory, route information from the input unit, information from the GPS receiver about the present position of the car, and route information from the Gyro sensor to generate the configuration of an intersection that the user/driver is supposed to enter and an arrow indicating a driving route to the user and to display a progression rate of the car along the route, and a display driving unit for displaying the configuration of the intersection and the arrow for route guidance on the basis of output data from the controller and for performing a graphic operation on the configuration, whereby a gradual progression rate of the car is indicated in the directional arrow.

In an embodiment of the invention, the map data includes a plurality of nodes and links and configuration points, namely latitude/longitude coordinates, composing the complicated intersection.

In another embodiment of the invention an entrance link of the car in the intersection, the entrance link being extracted from the map data memory, is headed up.

In further another embodiment of the invention, as for the heading up, calculations of relative angles between a travelling direction of the car and other roads connected to the intersection are derived from a table of trigonometric function.

In still another embodiment of the invention, as for indicating the progression rate of the car in the intersection, the arrow for route guidance is gradually filled or emptied.

According to another aspect of the invention, an operating method of a navigation system includes the steps of obtaining information about a complicated intersection, calculating heading up and screen coordinates, displaying the complicated intersection based on the screen coordinates being converted, displaying a route that passes through the complicated intersection and gradually changing the colour of the route to be correspondent to a present position of the car, thereby indicating a present position of the car on the route.

In again another embodiment of the invention, calculating heading up and screen coordinates is performed on the basis of information input to a controller, and the configuration of the complicated intersection is headed up through a rotation around a connection node of an entrance link, and absolute latitude/longitude coordinates are converted to the screen coordinates of the car.

Therefore, the navigation system of the invention displays on the information screen for a vehicle the configuration of the complicated intersection connected to the entrance road of the car by using the directional arrow showing the travelling path the driver should take in the intersection, and at the same time graphically shows the progression rate of the car based on the present position of the car in the complicated intersection, thereby providing a high quality service with better visibility to the driver.

Also, generating and displaying the directional arrow for guidance in intersections and the rough configuration of the intersection do not take much of calculation. Hence, the navigation system of the invention can be applied to small capacity terminals.

Additional advantages, objects, and features of the invention will be set forth in the part in the description which follows and will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which reference numbers refer to corresponding elements and wherein

FIG. 7A through FIG. 7C illustrate a rough configuration of a complicated intersection and a progression rate of a car in the intersection, using an arrow directing to a path the car is headed to.

DETAILED DESCRIPTION OF PREFERRED EMBODIMENTS

The following detailed description will present a navigation system and an operating method thereof according to a preferred embodiment of the invention in reference to the accompanying drawings.

Figure 1:
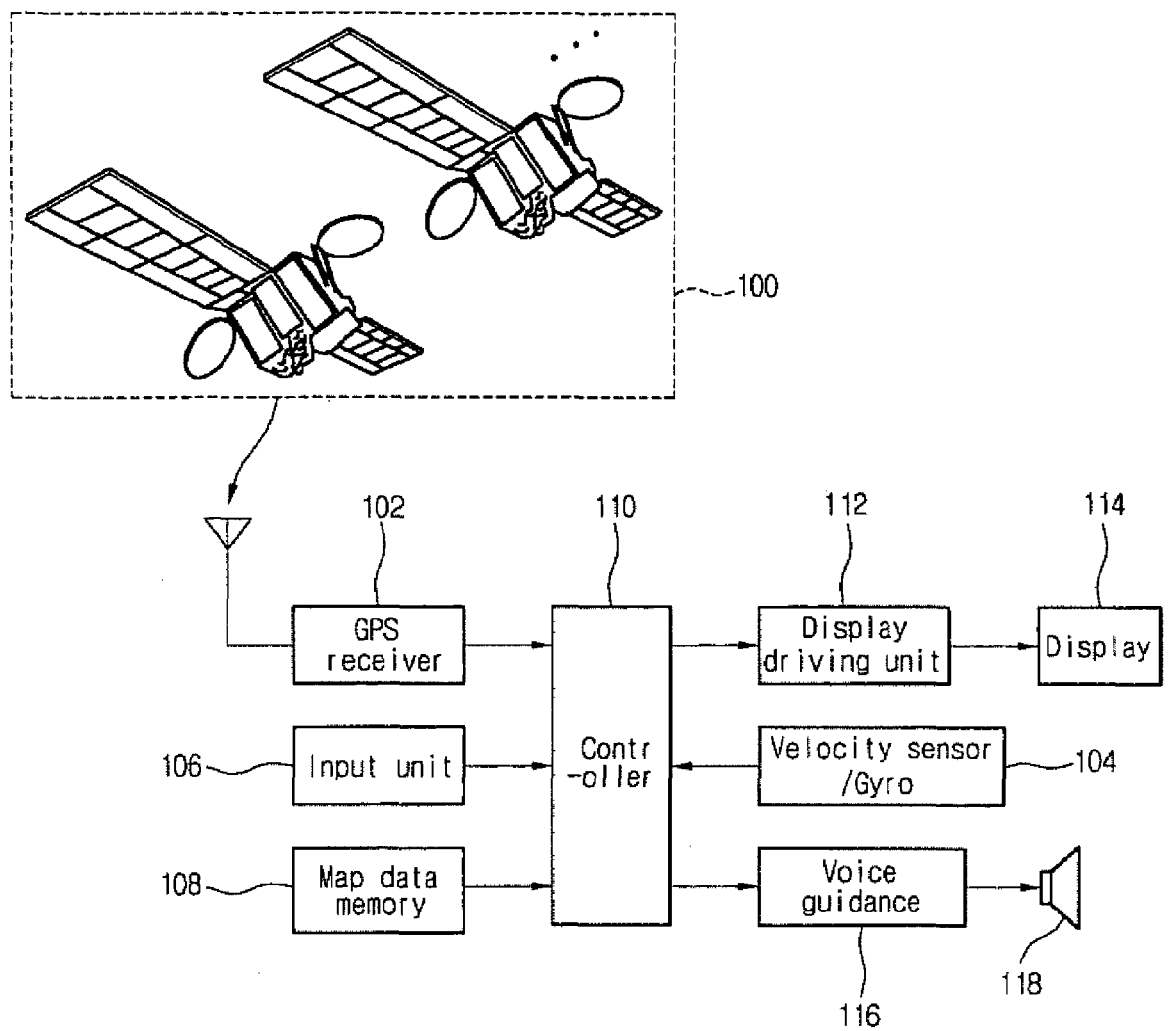
FIG. 1 is a diagram illustrating a configuration of a related art navigation system.
Figure 2:
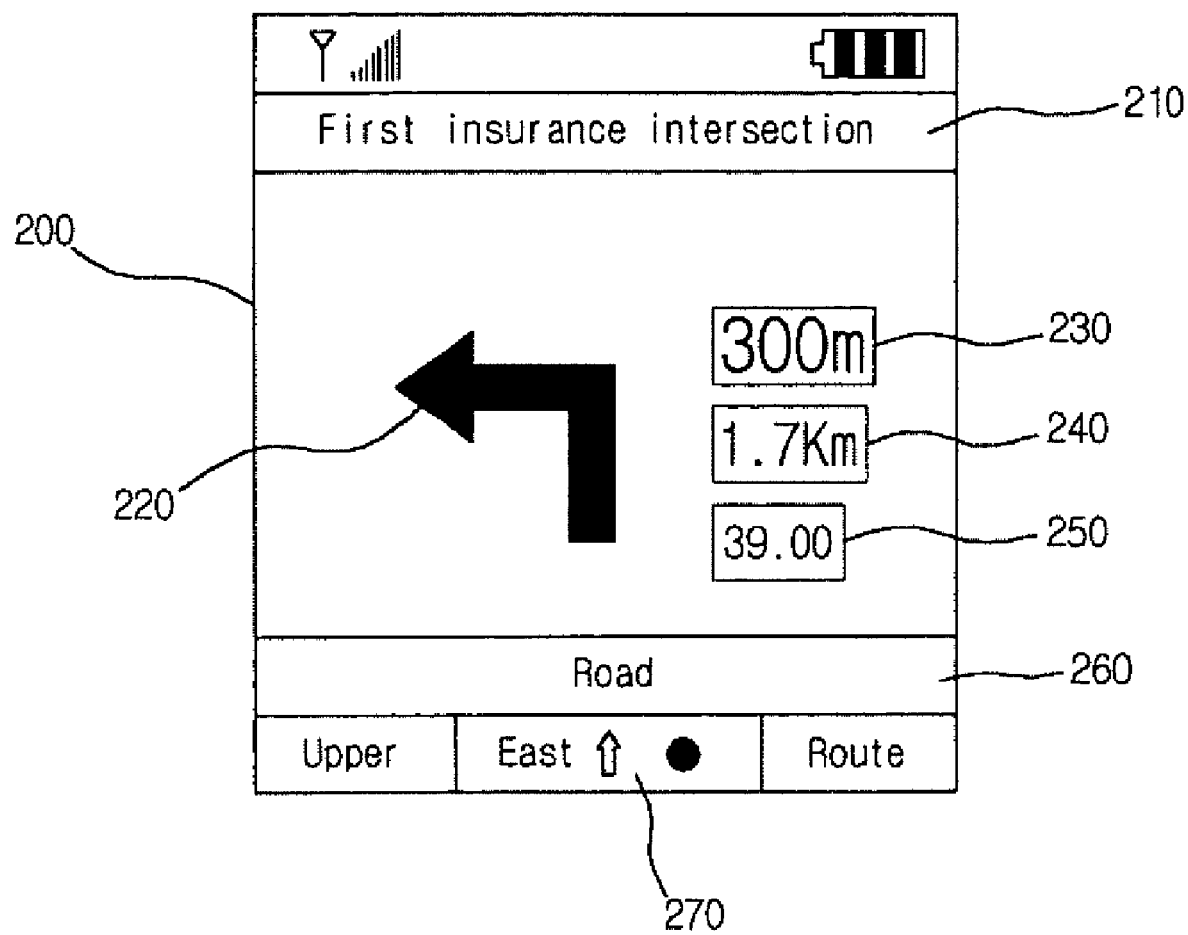
FIG. 2 illustrates one embodiment of a traffic information service, in which a portable terminal displays guidance for an intersection, i.e. an intersection at which a car should turn, by using an arrow.
Figure 3A:
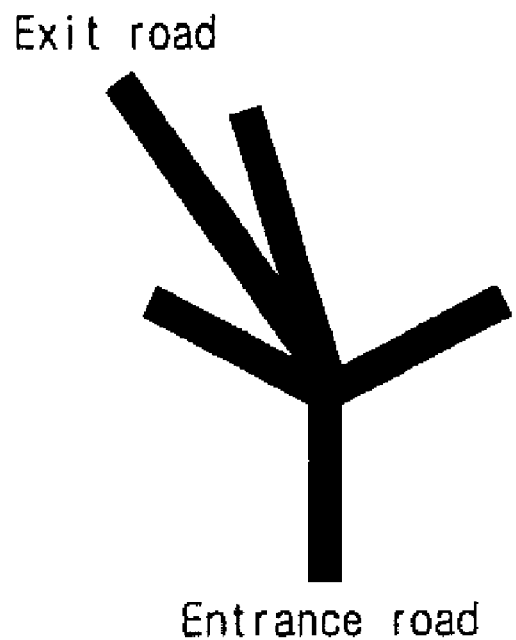
FIG. 3A through FIG. 3C illustrate usage of a directional arrow to an exit road, when an intersection has a complicated configuration, according to a related art TBT navigation system.
Figure 3B:
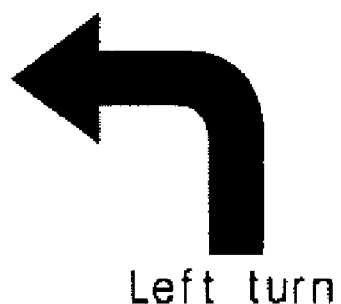
Figure 3C:
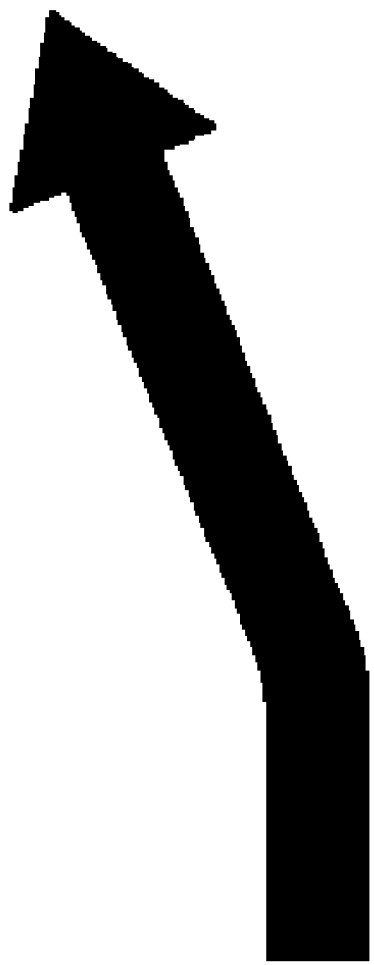
Figure 4:
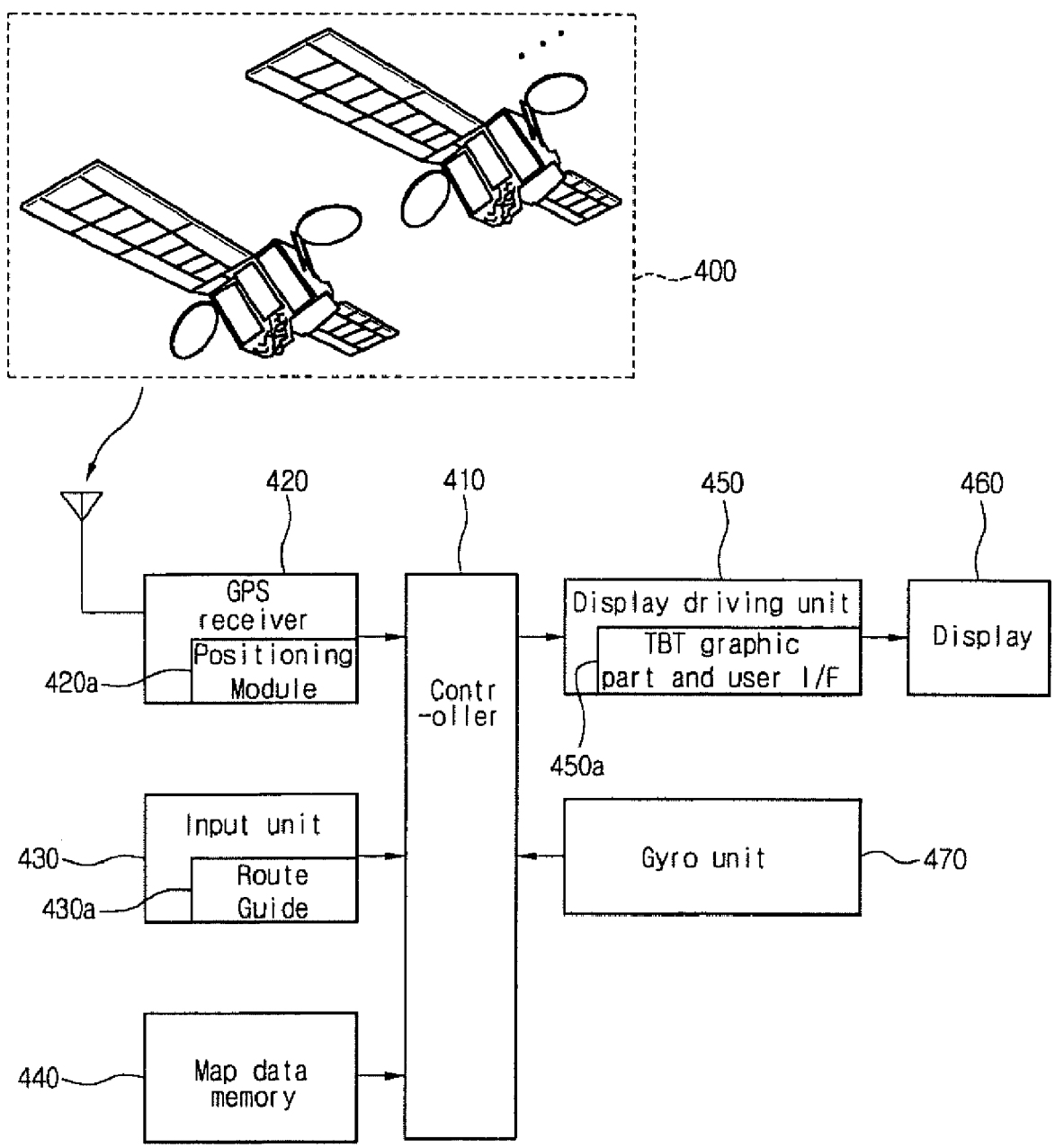
FIG. 4 is a block diagram illustrating components of a navigation system of the present invention, in which guidance for intersections and a progression rate of a car in a complicated intersection is provided.

FIG. 4 is a block diagram illustrating components of the navigation system of the present invention, in which guidance for intersections and a progression rate of a car in a complicated intersection is provided.

Referring to FIG. 4, the navigation system according to the present invention includes a map data memory 440 for storing map data including a plurality of nodes and links and configuration points thereof that compose complicated intersections, an input unit 430, in which a user inputs information or designates a travelling path, the input unit 430 providing information on a route from an entrance road of a car to an exit road from an intersection connected to the entrance road, a GPS receiver 420 including a positioning module 420a that detects a present position of a car on the basis of position information of the car provided from at least one GPS satellite 400, a Gyro sensor 470 for detecting a rotation angle of the car, a controller 410, which uses the map data from the map data memory 440, route information from the input unit 430, information from the GPS receiver 420 about a present position of the car and route information from the Gyro sensor 470 to generate the configuration of an intersection the car user/driver is supposed to enter and an arrow indicating a driving route to the user and to display a progression rate of the car along the route, and a display driving unit 450 for processing, on the basis of output data from the controller 410, a TBT graphic using a TBT graphic part and user I/F (interface) part 450a, whereby a gradual progression rate of the car is indicated in a directional arrow over the configuration of the intersection and displayed on a display 460.

The navigation system of the present invention performs heading up on an entering link of the car in the intersection. Here, 'heading up' means placing the travelling direction of the car indicates the upper part of the screen all the time.

In other words, the travelling direction becomes 0 degree, and the other connected roads are expressed in terms of relative angles to the travelling direction.

The reference of heading up is a node, or an intersecting point, where the entrance road is connected to the complicated intersection. Also, an arrow indicates the traveling direction starting from a point where the car has not yet reached the node.

As for the heading up, the system derives calculations of relative angles between the travelling direction of the car and other roads connected to the intersection, using a table of trigonometric function (e.g., if a reference is made to sin 30, SIN_TABLE[30] is used).

To indicate the progression rate of the car in the complicated intersection, the controller 450 constantly receives from the positioning module 420a of the GPS receiver 420 information about the present position of the car, and controls the display driving unit 450 to graphically fill/empty the directional arrow for guiding on the entering route and in the configuration of the displayed complicated intersection step by step.

An operation of the navigation system including the above described structure is now explained below.

An information terminal for a vehicle mounted with a TBT navigation system includes the GPS receiver 420 including the positioning module 420*a*. The information terminal for the vehicle obtains a position information of the car by receiving wave signals from GPS satellites, stores the position information in the map data memory 440 equipped in the car, and figures out a present position of the car.

When the user/driver inputs a destination through the input unit 430, the information terminal for the vehicle selects an optimum route or a shortest route to the destination.

If the driver in order to get to the destination has to go through many intersections or a complicated intersection connected to other roads in a complicated way, the navigation system performs the following.

At first, the system marks the body of the directional arrow for guidance on the configuration of the complicated intersection connected to the entrance road where the car is at and on the links of a path from the entrance road to the exit road the driver needs to take to get to the destination by using a corresponding colour on the body of the arrow.

The navigation system puts the head of the arrow on a starting node of the link for exiting the complicated intersection, and shows the driver from which direction he should enter and to which direction he should exit.

To obtain the configuration of the complicated intersection, it is necessary to know all roads connected to the intersection with respect to the entrance road of the car, and to calculate relative angles between the entrance road and the intersection and between roads. In this manner, phases between roads composing the intersection can be discovered.

Here, when the configuration of the complicated intersection is extracted from a digital map in the terminal and displayed on a terminal screen, the navigation system performs heading up of the configuration with respect to the entrance link (i.e. places the configuration at the upper part of the screen in consideration of visibility).

Besides the heading up, route guidance of a TBT navigation system always places the entrance road in the vertical direction so that the entrance road is used as a reference for other roads.

That is to say, an entrance road inclined by a certain angle from true north is placed in a vertical line, and angles between the entrance road and each of the other roads are measured to express other roads.

To figure out the configuration of the intersection by heading up, the navigation system usually performs trigonometric function operations using a table of trigonometric function instead of a trigonometric library.

For instance, sin 30° can be referred to the table of trigonometric function, which is SIN_TABLE[30], or to be more specific, a desired result can be found in a one-dimensional array of the table.

In short, the table of trigonometric function is very convenient to use because it provides a trigonometric function value right away. However, when the navigation system needs to do floating pointer operations which require much more calculation and take longer time.

Then the route guide 430*a* provides the thusly obtained configuration of the intersection to the controller 410, eventually providing the driver with the path he is supposed to take.

Using the information from the route guide 430*a*, the controller 410 controls the display driving unit 450 to display the path the driver should take from the complicated intersection in the shape of an arrow pointing to the path.

Also, the controller 410 figures out which part of the complicated intersection the car is located at, by the aid of the GPS receiver 420 including the positioning module 420*a*. Then, in order to mark the progression rate of the car, the controller 410 controls the display driving unit 450 to gradually fill or empty the path in the shape of the arrow.

Another way of marking the progression rate of the car is changing the colour of the arrow step by step as the car approaches the exit road, or filling the arrow starting from a start node of the entrance node/road.

Figure 5:
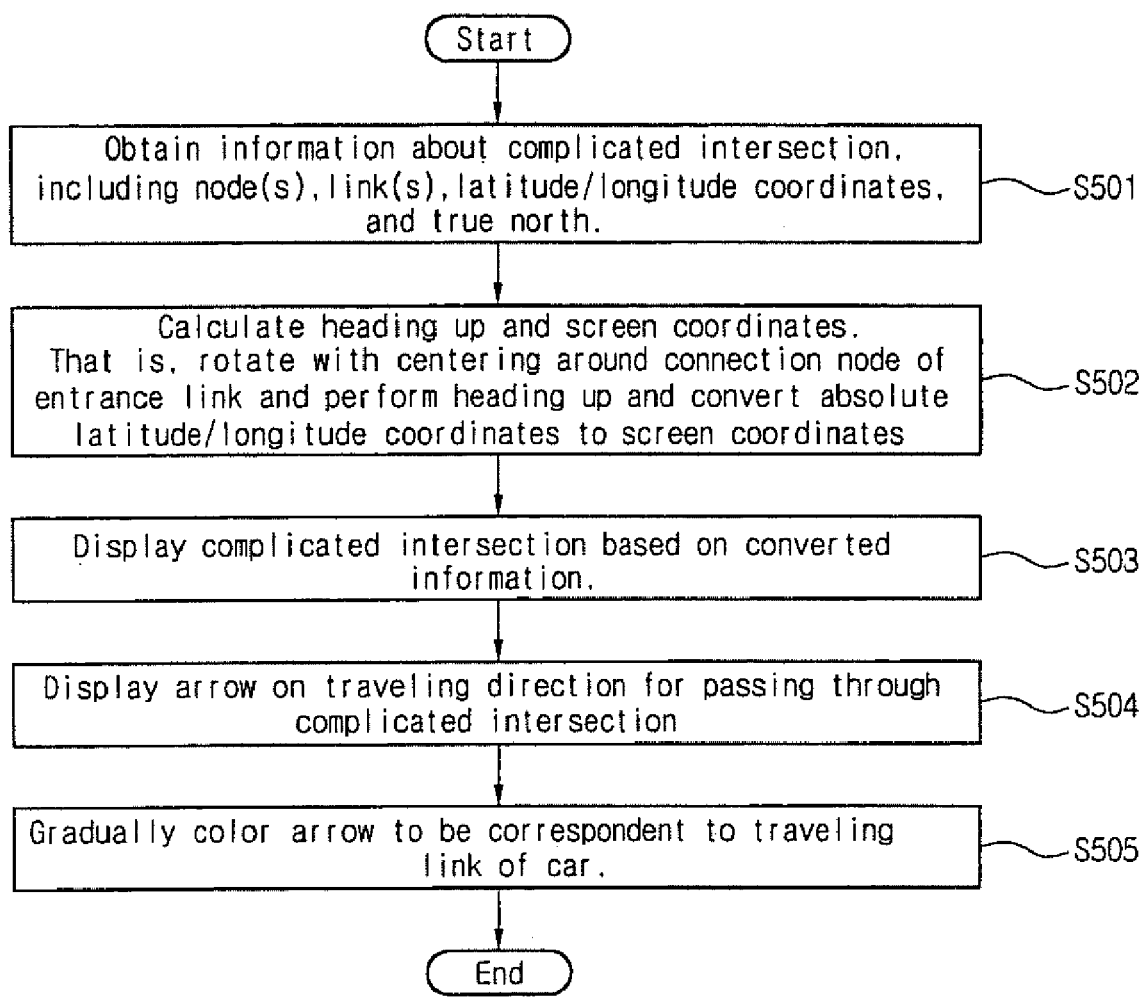
FIG. 5 is a flow chart describing a general procedure of a navigation system of the present invention.

With reference to FIG. 5, the general operating method of the navigation system of the present invention is now discussed.

The navigation system obtains information about the complicated intersection namely node(s) of the intersection the car is now entering, link(s), latitude/longitude coordinates, and true north, through the positioning module and the map data memory (S501).

To calculate heading up and screen coordinates, the navigation system uses the information input to the controller, rotate with centering around the connection node of the entrance link and perform heading up and convert absolute latitude/longitude coordinates to screen coordinates. (S 502).

Based on the converted screen information, a complicated intersection and a route going through the complicated intersection is generated and displayed on the display with an arrow (S 503, S504).

Receiving the position information of the car on the path from the positioning module, the navigation system gradually changes the colour of the directional arrow representing the path the driver needs to follow, keeping pace with the travelling link (S505).

Figure 6:
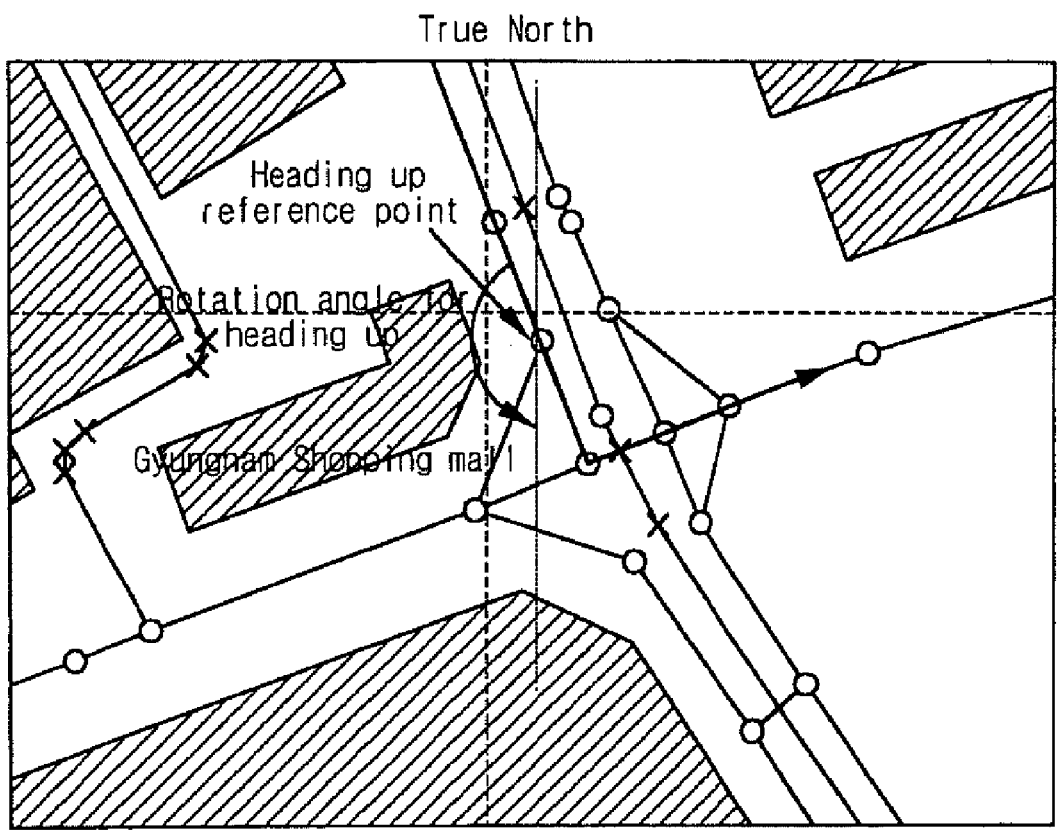
FIG. 6 illustrates one embodiment of a real life complicated intersection connected to an entrance road of a car, indicating how to figure out the configuration of the complicated intersection.

FIG. 6 illustrates one embodiment of a real life complicated intersection connected to an entrance road of a car, indicating how to figure out the configuration of the complicated intersection.

Based on the information stored in the map data memory 440, every node and link and configuration points (latitude/longitude coordinates) that comprise the complicated intersection are derived.

For heading up, a relative angle of the entrance link to true north is also derived.

The complicated intersection can be expressed in different links, in dependence of the travelling direction of the car.

Figure 7A:
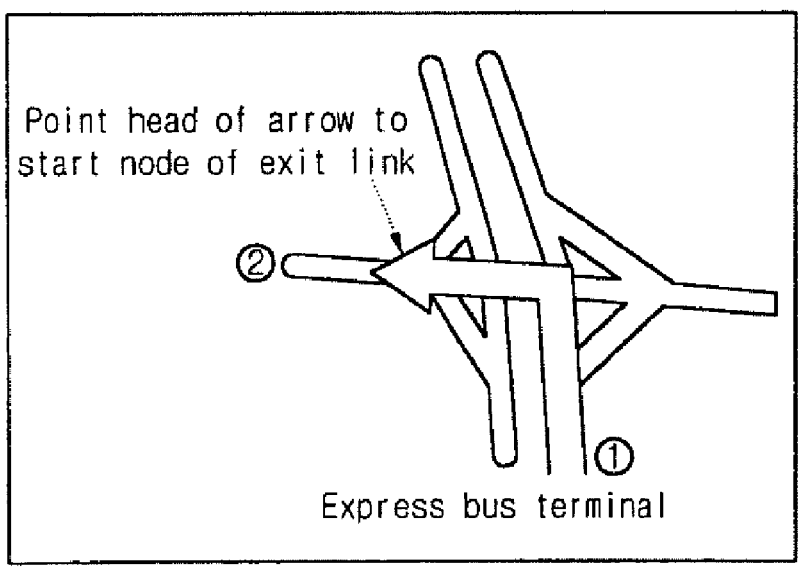
Figure 7B:
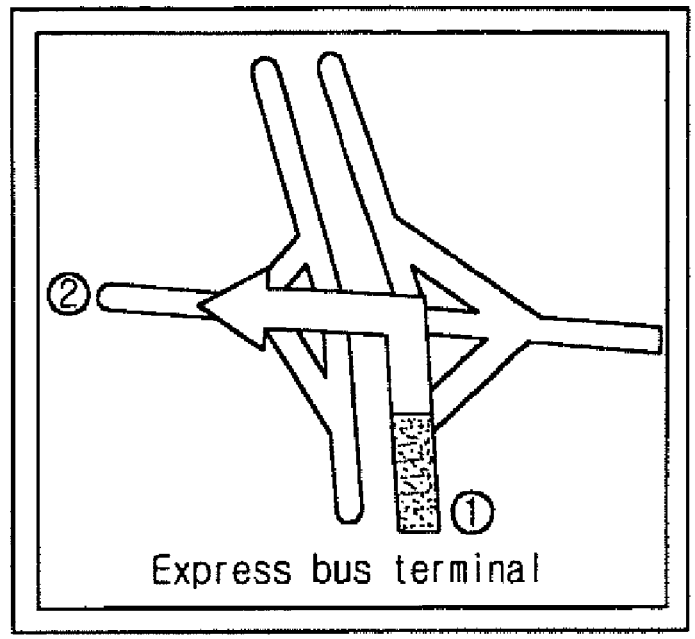
Figure 7C:
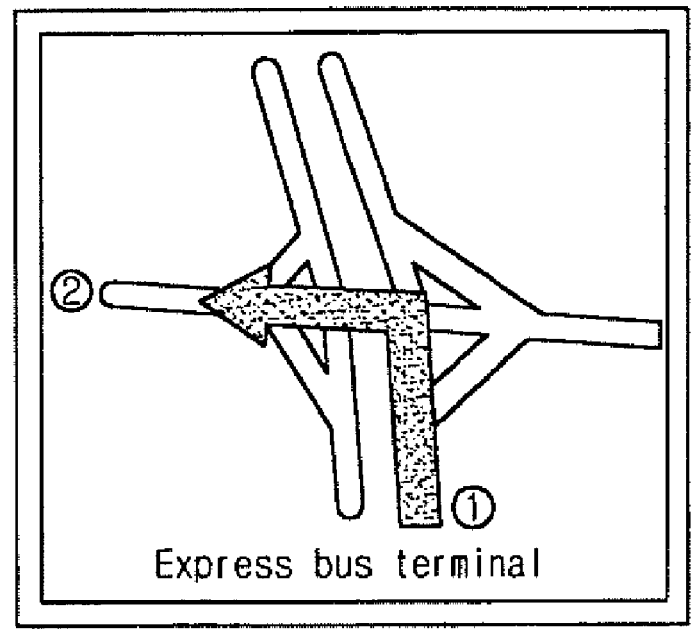

Centering around connection nodes of the entrance link, all configuration points are turned and headed up, as shown in FIGS. 7A, 7B, and 7C. After that, latitude/longitude coordinates of every node and link and configuration points composing the complicated intersection are converted to screen coordinates.

In other words, the entrance link is placed in the vertical direction, and using the heading up reference point as the origin, the navigation system revolves the path toward the exit road as much as a rotation angle. Then, the path the driver should take from the complicated intersection is easily visible.

The configuration of the complicated intersection is later displayed on the screen of the terminal, as shown in FIG. 7A.

Next, as shown in FIG. 7A, the links of the path provided by the route guidance data input unit are coloured in the same colour as the body of the arrow.

Here, the arrow mark is displayed on the configuration of the complicated intersection obtained by using phase data of each link with respect to the path the car should follow in the complicated intersection that is calculated in the route guide 430a, on the basis of the table of trigonometric function.

At this time, the head of the arrow points to the start node of the exit link from the complicated intersection.

Both FIG. 7A and FIG. 7C illustrate the configuration of the complicated intersection and the progression rate of the car in the intersection, using the arrow directing to the path the car is headed to.

Referring to FIG. 7A, the configuration of the complicated intersection is displayed centering on the entrance road ① that is headed up in the vertical direction. After finding out the present position of the car through the positioning module 420a, the navigation system marks the path the driver should take connecting the entrance road ① to the exit road ② on the configuration of the complicated intersection.

As depicted in FIG. 7B, the body of the directional arrow indicating the path the driver should follow in the complicated intersection connected to the entrance road ① of the car is being graphically filled little by little.

The changing progression rate of the car in the arrow can be indicated in diverse ways. For example, the colour of the arrow can be changed gradually from the start point, or the colour of the arrow can be erased gradually along the motion of the car.

FIG. 7C illustrates the completely filled directional arrow graphic, indicating that the driver has just gone though the complicated intersection.

Figure 8:
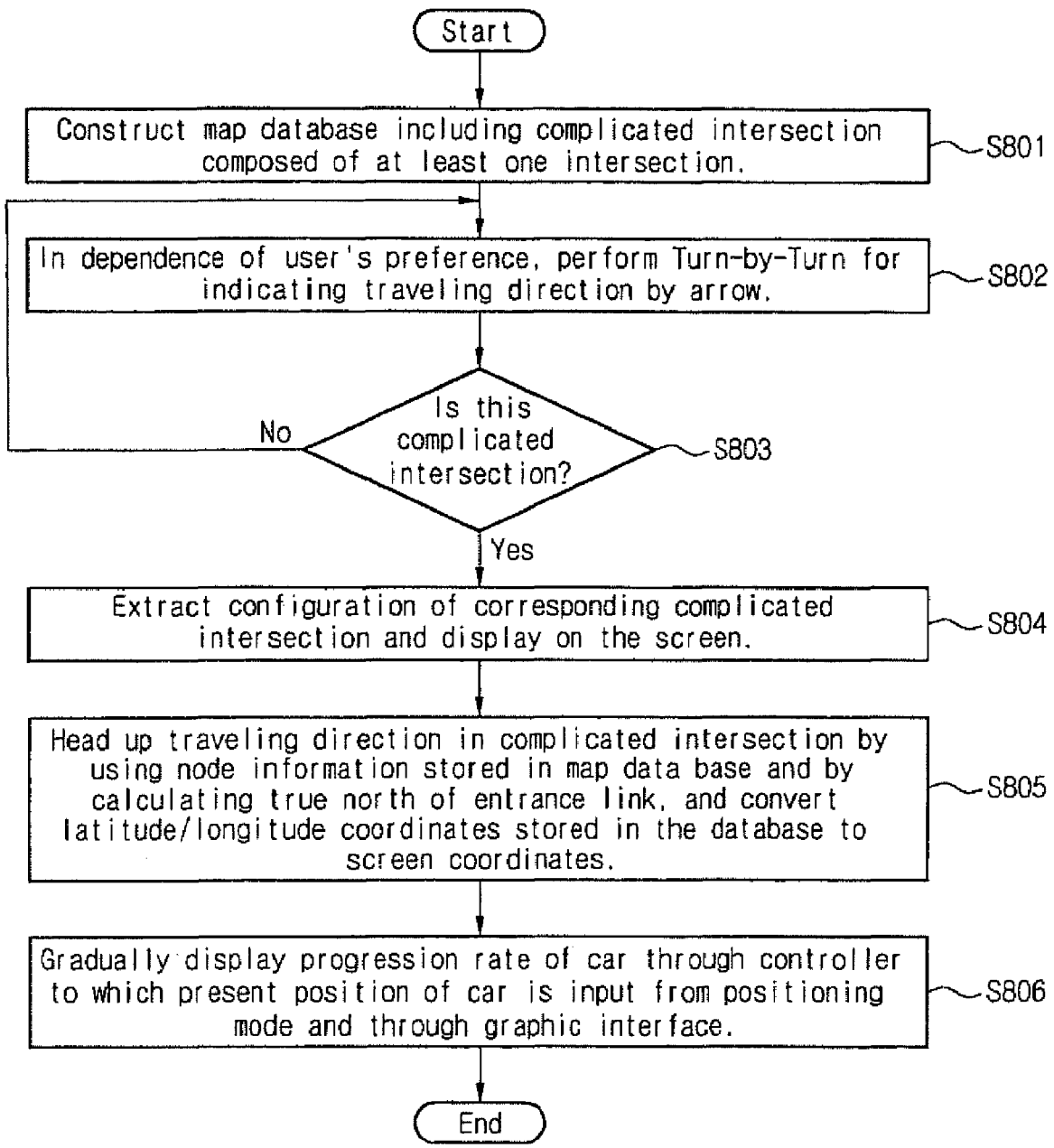
FIG. 8 is a flow chart describing an operating method of a navigation system of the present invention.

FIG. 8 is a flow chart describing an operation method of the navigation system according to the present invention.

The navigation system constructs a map database including a complicated intersection composed of at least one intersection (S801).

Applying the general Turn-By-Turn method, in which a travelling direction of the car is indicated by an arrow, the navigation system shows a route the driver should take in the intersection (S802).

While the driver is driving, the navigation system figures out whether or not a next entrance road is a complicated intersection, on the basis of information from the map data memory and the GPS receiver (S803). If the next entrance road is a complicated intersection, the navigation system extracts the configuration of the corresponding complicated intersection and displays the configuration on the screen (S804).

To display the travelling direction in the intersection, the navigation system calculates a rotation angle with respect to true north of the entrance link, using node information stored in the map data memory, and then performs heading up. Then, the navigation system converts the latitude/longitude coordinates stored in the database to screen coordinates (S805).

To be correspondent to the present position of the car given from the positioning module of the GPS receiver, the navigation system indicates the travelling direction the driver should go by gradually changing the graphic colour of the arrow displayed along the travelling path (S806).

Meanwhile, if the driver (or the user) wants, the progression rate of the car can be displayed not only for the complicated intersection but also for general intersections.

In step 806 for indicating the progression rate of the car corresponding to the position of the car in the complicated intersection, the controller to which the present position of the car is input and the graphic I/F (interface) are responsible for gradually changing the graphic colour of the arrow as the car moves along the path.

In conclusion, the present invention relates in general to the navigation system and the operating method thereof in which the navigation system shows the configuration of the complicated intersection the driver is about to enter, and displays where to turn and a progression rate of the car on the path the driver is headed to.

Therefore, the navigation system of the invention displays on the information screen for a vehicle the configuration of the complicated intersection connected to the entrance road of the car by using the directional arrow showing the travelling path the driver should take in the intersection, and at the same time graphically shows the progression rate of the car based on the present position of the car in the complicated intersection, thereby providing a high quality service with better visibility to the driver.

Also, generating and displaying the directional arrow for guidance in intersections and the rough configuration of the intersection do not take much of calculation. Hence, the navigation system of the invention can be applied to small capacity terminals.

While the invention has been shown and described with reference to certain preferred embodiments thereof, it will be understood by those skilled in the art that various changes in form and details may be made therein without departing from the spirit and scope of the invention as defined by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A vehicle navigation system, comprising:
a controller configured to generate a map of an intersection, to generate a first indication for indicating a suggested route for passing through the intersection, and to generate a second indication for indicating a location of the vehicle and for indicating a progression of the vehicle, the location of the vehicle being indicated by a shape of the second indication, the progression of the vehicle being indicated as the vehicle changes said location by changing the shape of the second indication; and
a display unit for displaying the first indication on the map of the intersection and for displaying the second indication, wherein the controller is configured to display the second indication by gradually changing the shape of the second indication according to the progression of the vehicle.

2. The system according to claim 1, wherein the controller is configured to display the second indication in the first indication.

3. The system according to claim 2, wherein the controller is configured to display the second indication in the first indication according to the progression of the vehicle by gradually filling the first indication with color.

4. The system according to claim 2, wherein the controller is configured to display the second indication in the first indication according to the progression of the vehicle by gradually removing color from the first indication.

5. A vehicle navigation system, comprising:
a controller configured to generate a map of an intersection and to generate a first indication for indicating a suggested route passing through the intersection; and
a display unit configured to display the first indication on the map of the intersection and to display a second indication on the first indication, the second indication for indicating a location of a vehicle in the map of the intersection, wherein the controller is configured to display the second indication by gradually filling the first indication with color.

6. A vehicle navigation system, comprising:
a controller configured to generate a map of an intersection and to generate a first indication for indicating a suggested route passing through the intersection; and
a display unit configured to display the first indication on the map of the intersection and to display a second indication on the first indication, the second indication for indicating a location of a vehicle in the map of the intersection, wherein the controller is configured to display the second indication by gradually removing color from the first indication.

7. A vehicle navigation system, comprising:
a GPS unit configured to detect a location of a vehicle based on information from at least one GPS satellite;
a controller configured to generate a map of an intersection that the vehicle approaches and to generate a first indication for indicating a suggested route for approaching and for departing the intersection; and
a display unit configured to display the first indication on the map of the intersection and to display a second indication on the first indication, the second indication for indicating the location of the vehicle and for indicating a progression of the vehicle, wherein the controller is configured to gradually change a shape of the second indication according to the progression of a vehicle.

8. A vehicle navigation system, comprising:
a controller configured to generate a map and to generate a first indication for indicating a suggested route passing through an intersection included in the map; and
a display configured to display the first indication on the map and to display a second indication on the first indication, the second indication for indicating a location of a vehicle in the intersection, wherein the controller is configured to change a shape of the second indication according to a progression of the vehicle.

9. The vehicle navigation system according to claim 8, wherein the first indication is an arrow for indicating the suggested route.

10. The vehicle navigation system according to claim 8, wherein the controller is configured to gradually change the shape of the second indication.

11. The vehicle navigation system according to claim 10, wherein the controller is configured to gradually change the shape of the second indication from nothing into a shape of the first indication.

12. The vehicle navigation system according to claim 10, wherein the controller is configured to gradually change the shape of the second indication from a shape of the first indication into nothing.

13. A vehicle navigation system, comprising:
a GPS unit configured to detect a location of a vehicle based on information from at least one GPS satellite;
a controller configured to generate a map of an intersection that the vehicle approaches and to generate a first indication for indicating a suggested route for approaching and for departing the intersection; and
a display unit configured to display the first indication on the map of the intersection and to display a second indication in the first indication, the second indication for indicating the location of the vehicle and for indicating a progression of the vehicle, wherein the controller is configured to display the second indication in the first indication according to the progression of the vehicle by gradually filling the first indication with color.

14. A vehicle navigation system, comprising:
a GPS unit configured to detect a location of a vehicle based on information from at least one GPS satellite;
a controller configured to generate a map of an intersection that the vehicle approaches and to generate a first indication for indicating a suggested route for approaching and for departing the intersection; and
a display unit configured to display the first indication on the map of the intersection and to display a second indication in the first indication, the second indication for indicating the location of the vehicle and for indicating a progression of the vehicle, wherein the controller is configured to display the second indication in the first indication according to the progression of a vehicle by gradually removing color from the first indication.

* * * * *